M. C. SCHWEINERT.
TIRE PRESSURE GAGE.
APPLICATION FILED SEPT. 24, 1915.

1,291,187.

Patented Jan. 14, 1919.
2 SHEETS—SHEET 1.

WITNESSES:
René Bruine
Fred White

INVENTOR:
Maximilian Charles Schweinert,
By Attorneys,
Fraser, Dink & Myers

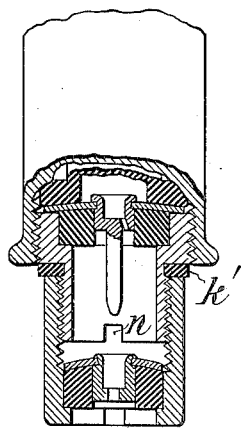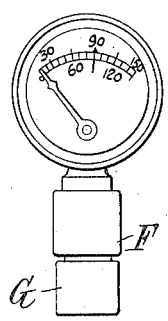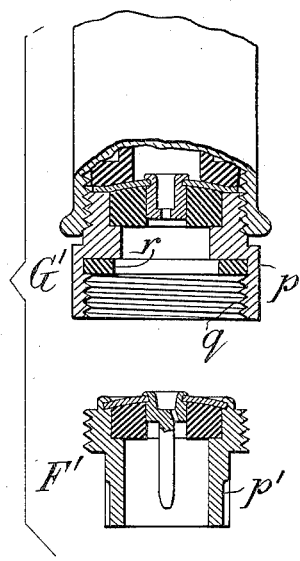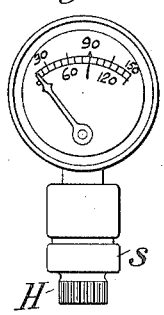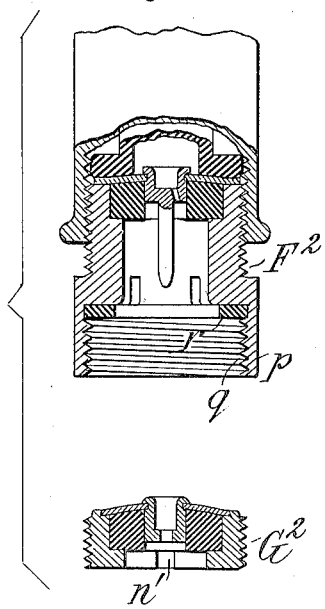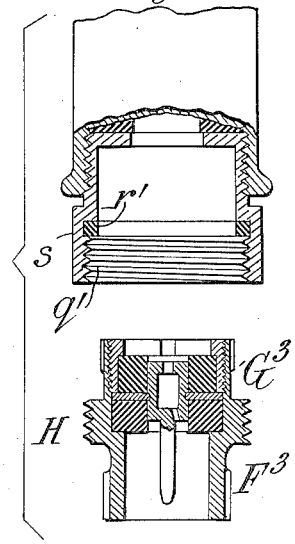

UNITED STATES PATENT OFFICE.

MAXIMILIAN CHARLES SCHWEINERT, OF WEST HOBOKEN, NEW JERSEY.

TIRE-PRESSURE GAGE.

1,291,187.   Specification of Letters Patent.   Patented Jan. 14, 1919.

Application filed September 24, 1915.   Serial No. 52,455.

*To all whom it may concern:*

Be it known that I, MAXIMILIAN CHARLES SCHWEINERT, a citizen of the United States of America, residing at West Hoboken, in the county of Hudson and State of New Jersey, have invented certain new and useful Improvements in Tire-Pressure Gages, of which the following is a specification.

This invention relates to gages for measuring the pressure in pneumatic tires.

It is practically necessary that a gage for this purpose shall have what is known as a deflating foot, that is, it shall have at its open end which is to fit onto the tire valve, a central portion so located as to press down the deflating pin and thereby unseat the check of the tire valve. It is customary also to provide such gages with a soft packing or gasket at the foot to make an airtight fit with the upper part or rim of the tire valve.

Such gages have to be specially constructed according to the type of tire valve with which they are to be used. The Schrader valve, which is standard throughout the United States, has its deflating pin projecting above the rim of the valve casing, so that the gage foot requires only a deflating anvil at about the level of the packing face of the gasket. Some valves of this type are also in use in Europe; but generally the valves in use there have the deflating stem or valve pin ending considerably below the rim of the valve casing, and hence require the gage foot to have a deflating pin projecting considerably beyond the seating face of the gasket so as to enter deeply within the valve casing and unseat the check.

By reason of these differences it has been customary to make gages of different constructions as to the deflating foot for use in the United States and for use in Europe respectively. This involves the difficulty that a car used for example in Great Britain, may through the replacement of some of its tires or inner tubes, come in time to have some of its wheels fitted with tires having Schrader valves and some with tires having valves of the European type. Heretofore this has required the owner to carry two gages adapted to the respective tire valves.

The present invention aims to render a gage adapted to one type of tire valve readily adaptable to the other type of tire valve. For this purpose the gage has two different deflating feet, so that either may be used according to the type of tire valve on the tire.

In Figures 1 to 9 of the accompanying drawings the invention is illustrated as applied to a gage having normally a deflating foot adapted for the European type of valve, and having a supplemental and separable foot adapted for the American type of valve.

Fig. 6 shows in elevation the supplemental foot removed, of which

Figs. 9 to 12 are fragmentary longitudinal sections of modified constructions.

Figs. 13 and 14 are elevations of dial gages.

Figure 1:
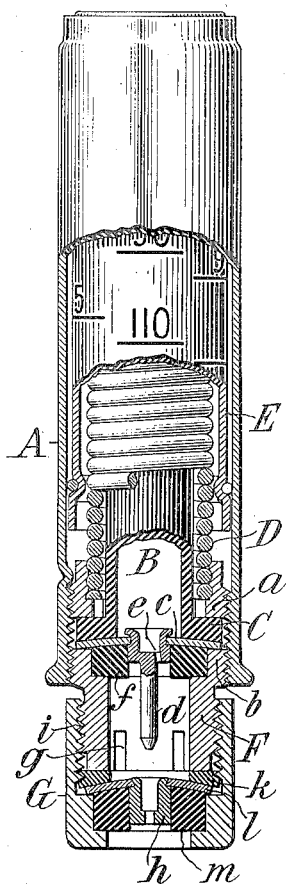
Fig. 1 is an elevation, partly broken away in vertical mid-section, of the complete gage.
Figure 6:
Figure 3:
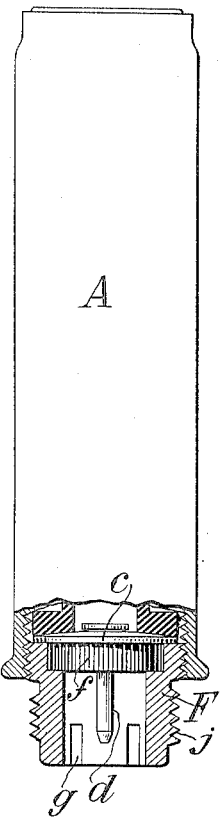
Fig. 3 is an elevation showing in section the lower part of the gage with the supplemental foot removed.
Figure 7:
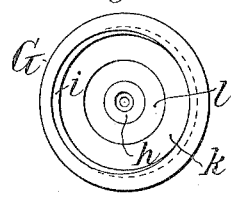
Fig. 7 is an inverted plan.
Figure 4:
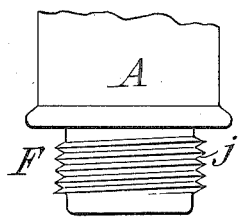
Fig. 4 is an elevation of the lower part of the gage of Fig. 3.
Figure 2:
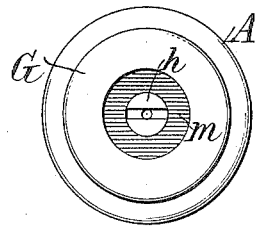
Fig. 2 is an inverted plan of the lower end thereof.
Figure 5:
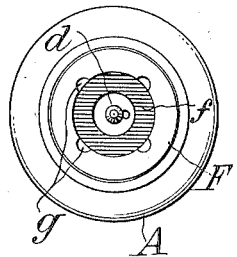
Fig. 5 is an inverted plan of such lower end.
Figure 8:
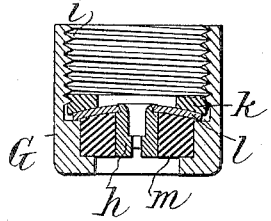
Fig. 8 shows the supplemental foot detached in mid-section.

It is understood that the gage proper may be of any known or suitable construction, and forms no part of the present invention. The drawings show in Figs. 1 to 8 a gage of the straight line or so called "pencil type" and having the internal construction peculiar to the Schrader gage. This is shown only by way of illustration.

In the drawings, A is the outer shell or body of the gage; B is the internal rubber chamber forming the elastic expansible member thereof, being confined at its lower end C which is flanged, and inclosed within the coils of a helical spring D. Between this spring and the outer shell is a double shell or cup E which as the gage expands under pressure is projected beyond the top of the outer casing and remains there to indicate the pressure, being held frictionally in place. The flange C is clamped between an internal thimble $a$ and the threaded base $b$ on the foot F. Between said flange and this base $b$ is confined a metal disk $c$, in which in the construction shown is mounted the base of the deflating pin $d$, in which base is a small hole $e$ for admitting air to the interior of B. Within the base portion of the foot is confined a packing washer or gasket $f$.

So far as described the gage illustrated is the ordinary Schrader gage having the deflating foot peculiar to the European type of valve. The deflating pin $d$ projects considerably beyond the packing face of the gasket $f$, as clearly shown in Fig. 3. The foot F extends downwardly far enough to inclose and protect the pin $d$, leaving an annular space between ample for receiving the outer end of the valve casing. The foot is shown with internal notches (see Fig. 5) at $g$ for engagement by the tool used in screwing the foot home. None of these details are essential to the present invention.

G is the supplemental foot provided by the present invention. It is adapted to be slipped over the foot F, having any suitable engagement therewith, as for example a threaded engagement as shown. For this purpose the foot G is provided with internal threads $i$ and the foot F with external threads $j$. The foot G is provided with a packing ring or gasket $k$ to make a tight joint with the lower end of the foot F. It has the usual deflator $h$ shown as riveted to a disk $l$; it has also a usual packing ring or gasket $m$. It will be observed that the deflator $h$ does not project beyond the packing face of the gasket $m$, as is usual in the deflating foot of a gage for the American type of tire valve.

With a gage thus constructed the user has only to apply or take off the supplemental foot G according to the type of tire valve with which he desires to use the gage. With the American type of valve he applies the foot G. With the European type of valve he removes the foot G and uses the foot F.

The invention is not limited to constructing the gage with the European type of foot F as a permanent part of the gage and the American type of foot G as the detachable or supplemental foot.

To enable the foot G to make a tight joint when in place, the foot F must terminate in an uninterrupted rim, with which the packing $k$ may make a complete and tight joint. Hence the foot F is altered from the usual construction not only by adding the screw threads $j$, but also by omitting the usual nick for receiving a screw-driver to screw it home. The internal grooves $g$ $g$ are substituted for engagement by a special key or wrench for screwing in or removing the foot.

In Fig. 10 the American type of foot G' is applied as a substantially permanent part of the gage, while the foot F' is a detachable foot of the European type.

In the figures first described the supplemental foot is formed as a cap having within it a packing $k$ to make a tight joint with the end of the foot which forms a permanent part of the gage. Instead the packing may be applied to the gage as shown at $k'$ in Fig. 9. This enables the foot F to be formed with a nick $n$ to be engaged by a screw-driver.

Instead of the supplemental foot being formed as a cap to screw on external threads on the normal foot, the latter may be made with internal threads and the supplemental foot be constructed as a plug to screw into the normal foot, having outer threads engaging said internal threads. This is shown in Figs. 10 and 11, wherein the normal foot G' in Fig. 10 or $F^2$ in Fig. 11 terminates in a tubular portion $p$ having internal threads $q$ and carrying an internal packing gasket $r$; and the supplemental foot F' in Fig. 10 or $G^2$ in Fig. 11 is formed as an external screw-threaded plug which screws into the threads $q$ and seats tightly against the gasket $r$. In Fig. 10 the plug F' has a tubular extension $p'$ which is knurled to facilitate screwing in or out. In Fig. 11 the plug has no extension but is formed with nicks $n'$ to receive a screw-driver.

It is preferable to make one foot a substantially permanent part and that the other foot be attachable to or detachable therefrom, because when not in use the latter foot is screwed to the former and there are no loose parts, whereas if the two deflating feet were independently attachable to the gage body without either being attachable to the other, it would result that at all times one foot would be detached and liable to be lost.

The invention may be variously modified, as will be apparent to those skilled in the art.

In Fig. 12 the gage is shown without any deflating foot and a reversible plug or screw extension H is provided, the opposite ends of which are constructed as deflating feet of the respective kinds, the upper end constituting a foot $G^3$ of the American type and the lower end a foot $F^3$ of the European type. The plug H may be applied with either end outward, as desired. When it is required to apply the gage to a different type of valve, it is only necessary to unscrew the plug H, reverse it, and screw it back. The plug H screws into internal threads $q'$ in a piece $s$ forming the bottom member of the gage, and containing a gasket $r'$.

Figs. 13 and 14 show gages of the dial type having a swinging hand and constructed according to this invention. The gage of Fig. 13 has its lower part of the construction shown in Figs. 1 to 8. The gage 14 has its lower part of the reversible construction shown in Fig. 12.

It will be observed that in all of the forms of the invention illustrated, the two deflating feet designed for alternative use are arranged in alinement with one another so that there is no lateral projection, and consequently the compactness and symmetry of the standard gage having a single foot is retained. It will also be observed that whether the one deflating foot or the other is in use, the same duct or vent into the body of the gage is utilized, the construction avoiding the necessity of any valve or cock for shutting off vent connection with the foot which is not in use. In each construction the two deflating feet (when both are applied) are arranged the one in advance of the other, so that in venting air from a valve into the gage this air traverses successively the ducts of both feet.

I claim as my invention:—

1. A tire gage having two deflating feet, the one adapted to coöperate with a valve of one type, and the other adapted to coöperate with a valve of a different type, and each adapted for operative relation with the gage when the other is not in use.

2. A tire gage having two deflating feet, the one adapted to coöperate with a valve of one type and the other to coöperate with a valve of a different type, the gage and said feet being relatively adapted to enable the operator to use either foot as desired.

3. A tire gage having a deflating foot adapted to coöperate with a valve of one type, and having a supplemental deflating foot detachable therefrom and adapted to coöperate with a valve of a different type.

4. A tire gage having a deflating foot adapted to coöperate with a valve of one type, and having a supplemental deflating foot detachable therefrom and adapted to coöperate with a valve of a different type, such supplemental foot having means for securing it to the gage.

5. A tire gage having a deflating foot adapted to coöperate with a valve of one type, and having a supplemental deflating foot detachable therefrom and adapted to coöperate with a valve of a different type, said supplemental foot having packing means for making a tight joint between it and the gage.

6. A tire gage having a deflating foot comprising a packing gasket and a deflator, and having a supplemental deflating foot adapted for attachment to the gage and having also a packing gasket and a deflator, the deflator of one foot located substantially flush with the packing gasket thereof, and the deflator of the other foot protruding considerably beyond the packing gasket thereof.

7. A tire gage having two deflating feet formed on a reversible plug, so that either foot may be brought to operative position at will.

8. A tire gage having two deflating feet normally alined with one another, the one adapted to coöperate with a valve of one type and the other adapted to coöperate with a valve of a different type, and each adapted for operative relation with the gage when the other is not in use.

9. A tire gage having two deflating feet, the one projecting beyond the other, the respective feet adapted to coöperate with valves of different types, and each in operative relation with the gage when the other is not in use, and the outer one communicating with the gage through the vent duct of the inner one.

10. A tire gage having two deflating feet, each having valveless vent connection with the interior of the gage, the two feet adapted to coöperate with valves of different types and each adapted for operative relation with the gage when the other is not in use.

11. A tire gage having two deflating feet adapted respectively to coöperate with valves of different types, and valveless vent ducts traversing such feet successively, each foot adapted for operative relation with the gage when the other is not in use.

In witness whereof, I have hereunto signed my name in the presence of two subscribing witnesses.

MAXIMILIAN CHARLES SCHWEINERT.

Witnesses:
T. F. WALLACE,
FRED WHITE.